US012663571B2

(12) United States Patent
Miller et al.

(10) Patent No.: US 12,663,571 B2
(45) Date of Patent: Jun. 23, 2026

(54) BIREFRINGENT COATING TO REMOVE POLARIZATION DEPENDENT PHASE SHIFT

(71) Applicant: Arizona Board of Regents on Behalf of the University of Arizona, Tucson, AZ (US)

(72) Inventors: Sawyer Miller, Tucson, AZ (US); Linan Jiang, Tucson, AZ (US); Stanley Pau, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 334 days.

(21) Appl. No.: 18/687,757

(22) PCT Filed: Aug. 30, 2022

(86) PCT No.: PCT/US2022/075705
§ 371 (c)(1),
(2) Date: Feb. 28, 2024

(87) PCT Pub. No.: WO2023/034830
PCT Pub. Date: Mar. 9, 2023

(65) Prior Publication Data
US 2024/0418921 A1 Dec. 19, 2024

Related U.S. Application Data

(60) Provisional application No. 63/239,184, filed on Aug. 31, 2021.

(51) Int. Cl.
G02B 5/30 (2006.01)
G02B 5/28 (2006.01)

(52) U.S. Cl.
CPC ............ G02B 5/3083 (2013.01); G02B 5/285 (2013.01)

(58) Field of Classification Search
None
See application file for complete search history.

(56) References Cited

U.S. PATENT DOCUMENTS

| | | |
|---|---|---|
| 10,254,453 B2 | 4/2019 | Pau et al. |
| 2004/0001255 A1 | 1/2004 | Fratello |
| 2005/0154269 A1 | 7/2005 | Cameron |

OTHER PUBLICATIONS

International Search Report and Written Opinion mailed Nov. 30, 2022 for International Patent Application No. PCT/US2022/075705.

(Continued)

*Primary Examiner* — Robert E. Tallman
(74) *Attorney, Agent, or Firm* — Perkins Coie

(57) ABSTRACT

Methods, devices and systems are described to eliminate or reduce unwanted polarization aberrations associated with interference filters. An example method for producing a polarization aberration compensator for a thin film interference filter includes obtaining a set of Mueller matrix values based on polarization measurements of the thin film interference filter over a spectral range, and generating a metric based on a difference between a compensated Mueller matrix and an identity matrix over the spectral range. The compensated matrix represents a cumulative Mueller matrix for a combination of the thin film interference filter and the polarization aberration compensator. A configuration of the polarization aberration compensator is determined based on evaluating the metric that eliminates or reduces the difference between the compensated Mueller matrix and the identity matrix over the spectral range. Configuration parameters, including thicknesses of birefringent layers, fast-axis angles and the number of birefringent layers in the compensator are obtained.

27 Claims, 13 Drawing Sheets

Polychromatic collimated beam

Retarder stack at 45deg

Dichroic at 45deg

Filtered polychromatic collimated beam

(56)　　　　　References Cited

OTHER PUBLICATIONS

Li, Weiqi, et al., "Depolarization artifacts in dual rotating-compensator Mueller matrix ellipsometry," J. of Optics, 18, 055701, 2016.

Miller, Sawyer, et al., "Birefringent coating to remove polarization aberrations," Optics Express vol. 30, No. 12, pp. 20629-20646, 2022.

Smith, Matthew H., "Optimization of a dual-rotating-retarder Mueller matrix polarimeter," Applied Optics, vol. 41, Issue 13, pp. 2488-2493, 2002.

RMM1707

RMM141C

| Layer: | Thickness: | Orientation ($\theta$): | Material: |
|---|---|---|---|
| 1 | 1.59 | 205.7° | RMM1707 |
| 2 | 1.77 | 267.5° | RMM1707 |
| 3 | 1.72 | 152.4° | RMM1707 |
| 4 | 0.25 | 199.8° | RMM141C |

| Layer: | Thickness: | Orientation ($\theta$): | Material: |
|---|---|---|---|
| 1 | 2.06 | 181.3° | RMM141C |
| 2 | 0.98 | 331.8° | RMM141C |
| 3 | 1.38 | 37.3° | RMM141C |
| 4 | 0.63 | 330.4° | RMM1707 |

Each pattern is a multi-layer compensator for a range of AOI

Number of Segments

Curved surface

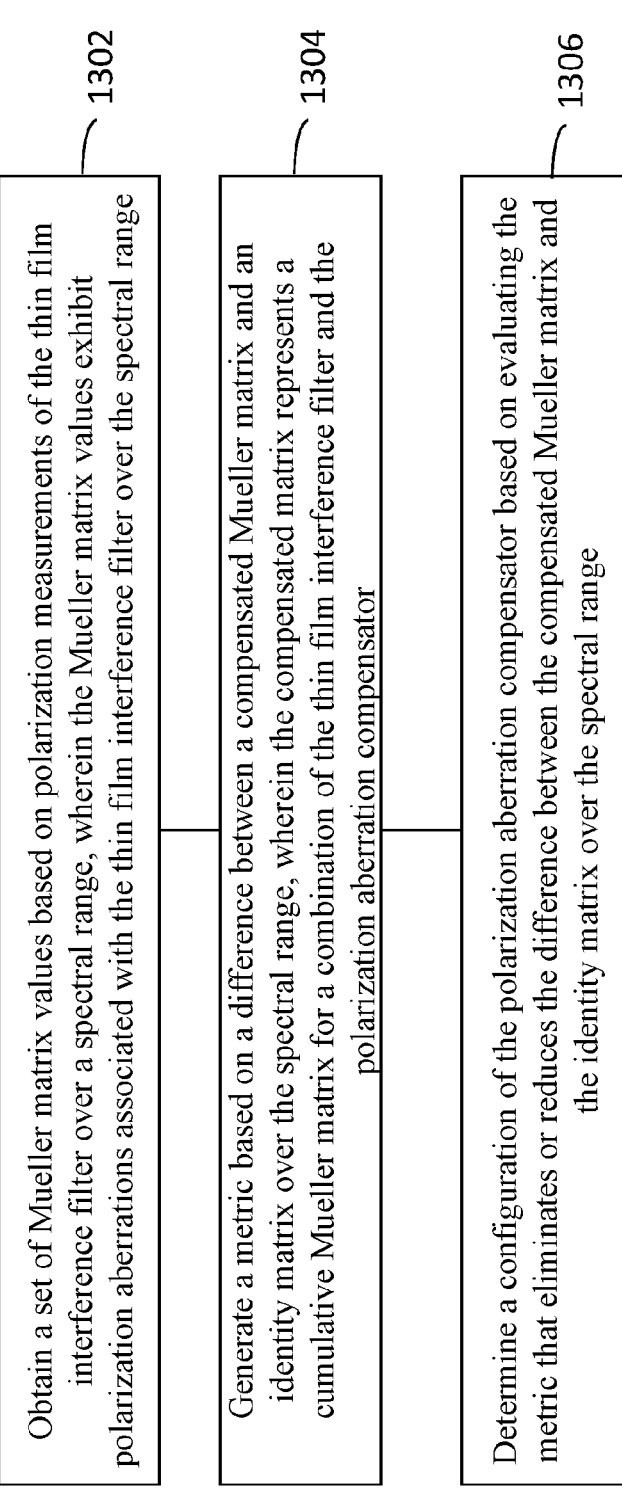

Obtain a set of Mueller matrix values based on polarization measurements of the thin film interference filter over a spectral range, wherein the Mueller matrix values exhibit polarization aberrations associated with the thin film interference filter over the spectral range ⟋ 1302

Generate a metric based on a difference between a compensated Mueller matrix and an identity matrix over the spectral range, wherein the compensated matrix represents a cumulative Mueller matrix for a combination of the thin film interference filter and the polarization aberration compensator ⟋ 1304

Determine a configuration of the polarization aberration compensator based on evaluating the metric that eliminates or reduces the difference between the compensated Mueller matrix and the identity matrix over the spectral range ⟋ 1306

FIG. 13

BIREFRINGENT COATING TO REMOVE POLARIZATION DEPENDENT PHASE SHIFT

CROSS-REFERENCE TO RELATED APPLICATION(S)

This patent document is a 371 National Stage Application of International Patent Application No. PCT/US2022/075705, filed Aug. 30, 2022, which claims priority to the provisional application with Ser. No. 63/239,184, titled "BIREFRINGENT COATING TO REMOVE POLARIZATION DEPENDENT PHASE SHIFT," filed Aug. 31, 2021. The entire contents of the above noted applications are incorporated by reference as part of the disclosure of this document.

TECHNICAL FIELD

This patent document generally relates to methods and devices that utilized polarized light and in particular to methods and devices that eliminate or reduce unwanted polarization aberrations.

BACKGROUND

Interference filters are used extensively in telecommunication, imaging and display applications to split, reflect and separate light of different wavelengths. Examples of filter types include long-wave pass, short-wave pass, notch and band pass filters, as well as 50/50 coatings used in beam splitters. Conventional interference filters are made of alternating layers of high and low index materials and are designed for unpolarized light. For many applications, the input light is polarized, and the interference filter introduces a phase shift that is dependent on the wavelength and polarization state of the light. This unwanted and "parasitic" phase shift is caused by different Fresnel reflections of s- and p-polarized light, which results in different optical path lengths (OPL) for s- and p-polarizations. The differing OPL for the two polarization states can lead to performance degradation of the optical instrument from aberration and loss.

SUMMARY

The disclosed embodiments relate to methods and devices that address the above problems and remove the unwanted phase shift by using multiple layers of birefringent materials. An example method for producing a polarization aberration compensator for a thin film interference filter includes obtaining a set of Mueller matrix values based on polarization measurements of the thin film interference filter over a spectral range, where the Mueller matrix values exhibit polarization aberrations associated with the thin film interference filter over the spectral range. The method also includes generating a metric based on a difference between a compensated Mueller matrix and an identity matrix over the spectral range, wherein the compensated matrix represents a cumulative Mueller matrix for a combination of the thin film interference filter and the polarization aberration compensator. Additionally, the method includes determining a configuration of the polarization aberration compensator based on evaluating the metric that eliminates or reduces difference between the compensated Mueller matrix and the identity matrix over the spectral range. The polarization aberration compensator includes a plurality of birefringent layers, and determining the configuration of the polarization aberration compensator includes determining one or more of a thickness of each birefringent layer, a fast-axis angle of each birefringent layer, and a number of the plurality of birefringent layers.

BRIEF DESCRIPTION OF THE DRAWINGS

FIG. 13 illustrates a set of operation that can be carried out for producing a polarization aberration compensator for a thin film interference filter in accordance with an example embodiment.

DETAILED DESCRIPTION

The disclosed embodiments use multiple layers of birefringent materials (sometimes referred to as the "polarization aberration compensator," the "phase shift compensator," or the "compensator" in this patent document) to remove all or significant amounts of the parasitic retardance over a band of wavelengths. In some embodiments, the thickness and orientation of the birefringent materials are determined by an algorithm to correct the interference filter's Mueller matrix. By adding differing thicknesses and orientations of the birefringent layers, the cumulative Mueller matrix of the combined interference filter and compensator is an identity matrix that can result in no polarization change over a certain wavelength range, or can limit the polarization error to within a desired tolerance. One example algorithm utilizes a constrained nonlinear multivariable solver to find a global minimum and best design for eliminating or reducing the parasitic retardance. One metric function for optimization includes the minimization of the Euclidean norm between each of the components of the solved/corrected Mueller matrix and the ideal identity matrix. Equation (1) describes the calculation of the optimization metric ($v_\lambda$), where the Euclidean norm is calculated from the elements of the solved/corrected Mueller matrix, denoted $m_{i,j}$, and the ideal non-polarizing identity matrix, denoted $I_{i,j}$.

$$v_\lambda = \sum_{i=0}^{3}\sum_{j=0}^{3}(m_{i,j} - I_{i,j})^2 \qquad (1)$$

The optimization metric can be minimized at, for example, 1 nm intervals in the wavelength region of interest. The outputs of the computations can be the thicknesses and angles of the birefringent layers. The birefringent material can include a stack of liquid crystal polymer (LCP). In some embodiments, the stack of birefringent materials can be applied to the interference filter, resulting in a single optic. The compensator can also be positioned on a separate substrate, allowing for its placement anywhere in the optical path.

Figure 1:
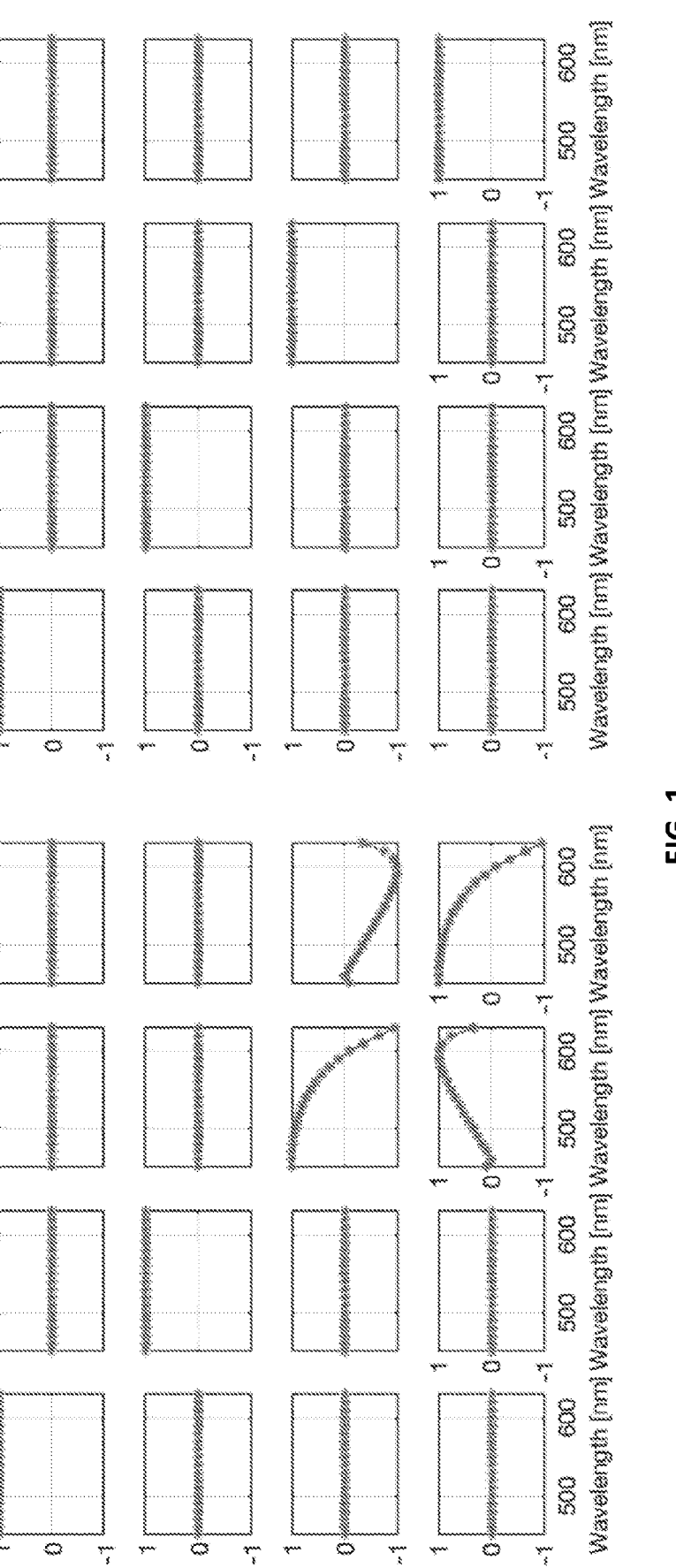
FIG. 1 illustrates a measured Mueller matrix of a short-pass interference filter as a function of wavelength at an angle of incidence of 45 degrees and an ideal Mueller matrix with no polarizing properties.

The polarization aberrations which are accrued by the interference filter can be described using the Mueller matrix. FIG. 1 (left) is a measured Mueller matrix (4×4) as a function of wavelength for a short-pass filter designed to be operated at 45 degrees angle of incidence (Edmund Optics Stock #69-205, 650 nm, 25 mm, dichroic shortpass filter). The dichroic filter acts as a quarter waveplate at 600 nm. FIG. 1 (right) illustrates the ideal case, an identity matrix for the same wavelength band. Comparing the measured Mueller matrix data and the ideal case, we see that the dichroic filter has severe polarization aberrations as compared to the ideal non-polarizing Mueller matrix. As a result, linear polarized light incident on the filter will be converted to elliptically polarized light with the ellipticity dependent on wavelength.

In the sections that follow, two example compensators are described to facilitate the understanding of the disclosed technology. The first example compensator is described with reference to FIG. 2, which illustrates a configuration that includes a compensator and a multi-layer interference filter-in this case a dichroic filter. The compensator is positioned to receive a polarized polychromatic collimated light at zero degrees (i.e., incident on the compensator at a normal angle). The example phase shift compensator has four layers of liquid crystal polymer (LCP) with different fast-axis orientations and thicknesses, and is designed to operate as a separate component (e.g., on a separate substrate) from the multi-layer interference filter, e.g., a dichroic filter that is positioned at a 45-degree angle with respect to the incident rays. The output is a filtered polychromatic collimated beam. It should be noted that, in some embodiments, the phase shift compensator can be positioned at the right-hand side of the interference filter to correct the polarization aberrations after the light exits the interference filter. In some embodiments, phase shift compensators can be placed at both sides of the interference filter to collaboratively effectuate the corrections.

Figure 2:
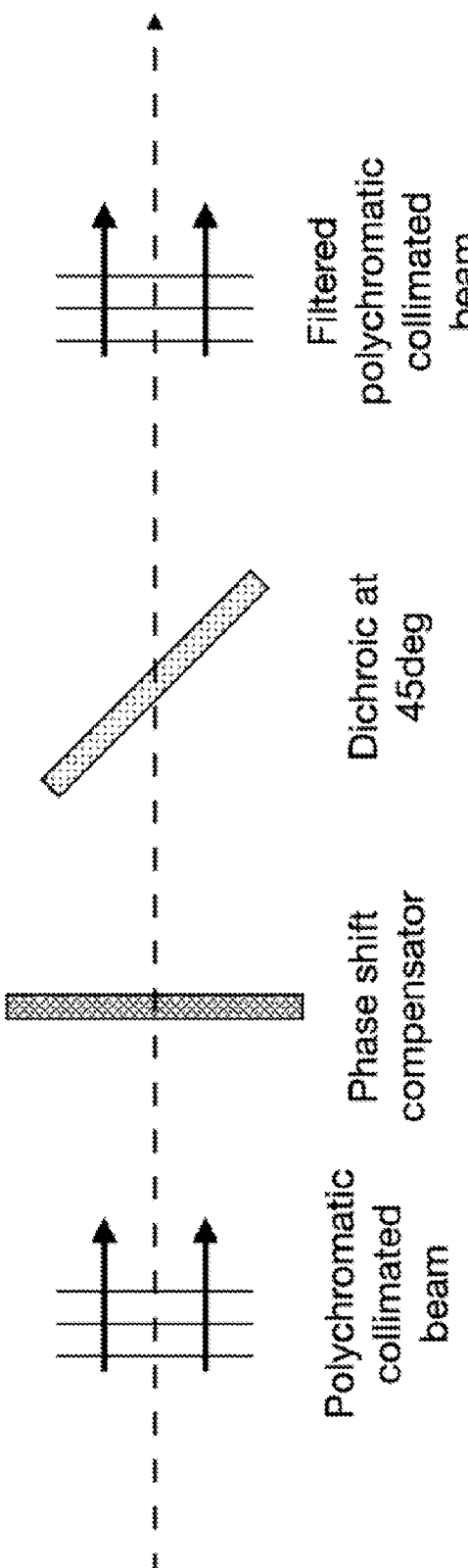
FIG. 2 illustrates an optical system that includes a compensator that receives a collimated light at normal incidence and a dichroic filter operating at 45 degrees in accordance with an example embodiment.
Figure 3:
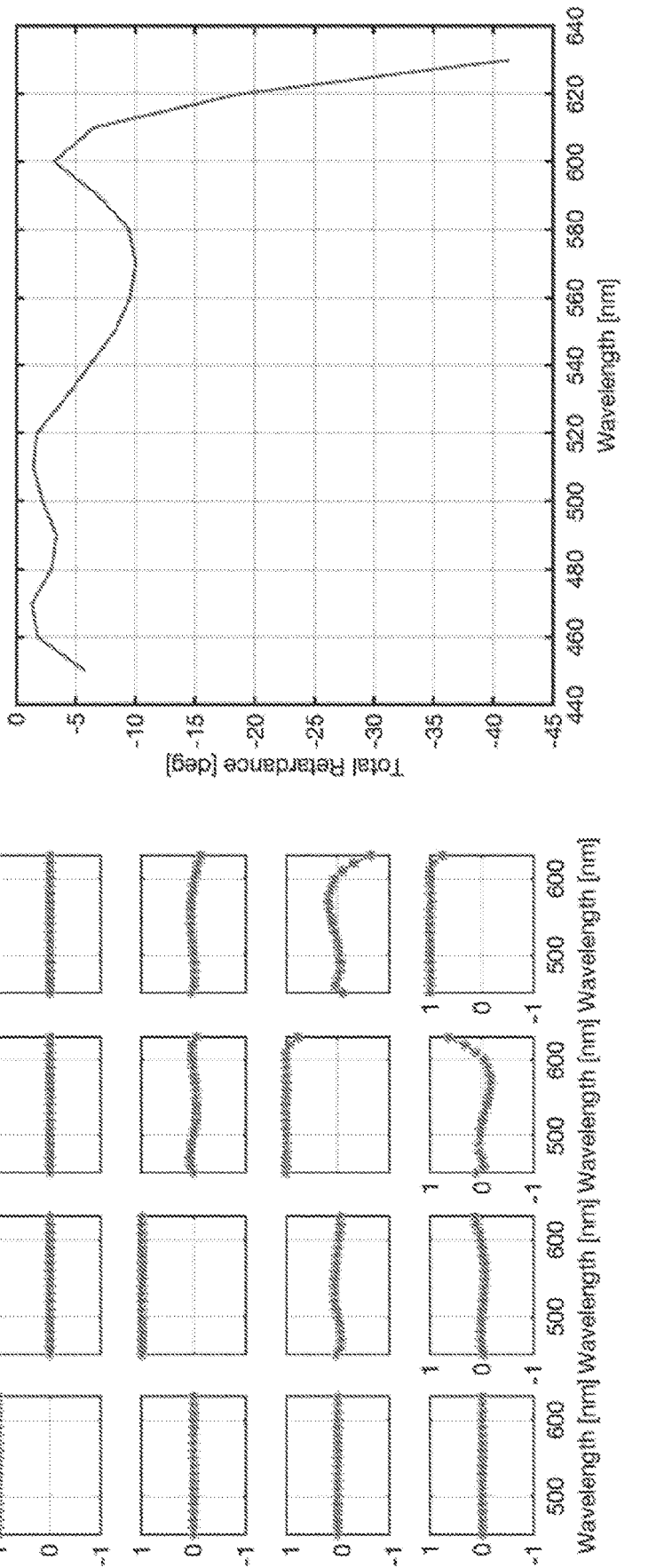
FIG. 3 illustrates the Mueller matrix and residual retardance associated with the combination of the compensator and filter of FIG. 2.

FIG. 3 shows the results associated with an example design for the phase shift compensator of FIG. 2. In particular, the left side illustrates Mueller matrix plots (as a function of wavelength) for the combination short-pass filter and compensator, and the right side shows residual retardance from the combination short-pass filter and compensator as function of wavelength. The results in FIG. 2 show a Mueller matrix that is much closer to the identity matrix and parasitic retardance of less than 10 degrees from 450 nm to 615 nm, with excellent correction (e.g., less than 5 degrees residual retardance) in the range 460 nm to 520 nm. It should be noted that the disclosed compensators can be designed to operate over a wider or a narrower range of wavelengths in accordance with the disclosed technology.

Figure 4:
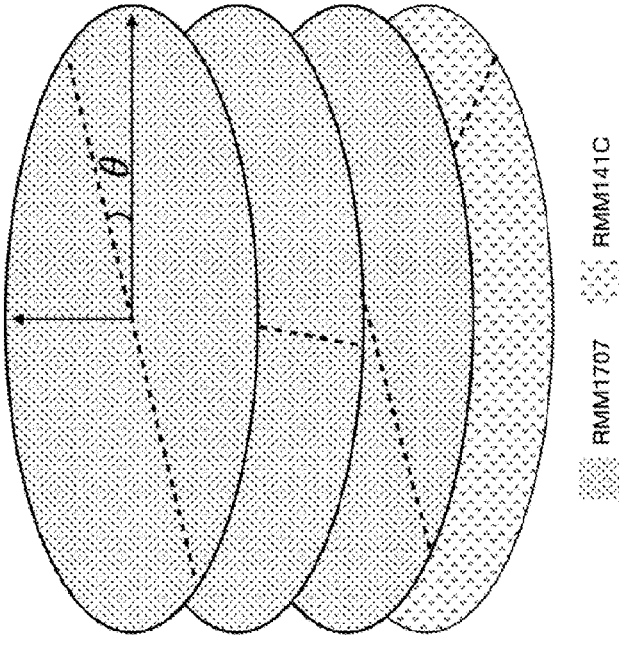
FIG. 4 illustrates parameters and a schematic of a multi-layer compensator corresponding to the configuration of FIG. 2 in accordance with an example embodiment.

FIG. 4 illustrates a Table that identifies the parameters that were solved for the normal incidence design depicted in FIG. 2, as well as a schematic (right side) showing the differing materials, differing thicknesses and differing fast-axis angles of the layers in the compensator film stack. The example thickness values in the Table are dimensionless and convey values relative to the thickness of a standard sample (further explained below). RMM141C has a standard thickness of 1.12 while RMM1707 has a standard thickness of 1.13. The orientation angle represents the fast-axis angle of the layer and is represented by the dashed line in the film stack that varies among different layers. The differing hash fill denotes the differing material used. RMM1707 and RMM141C are LCPs sold by EMD Electronics located at Philadelphia PA, part of Merck KGaA, Darmstadt, Germany. It should be noted that the schematic of the four-layer compensator is provided for illustration purposes, and therefore the dimensions, orientations, and the fast-axis angles of the layers may not be to scale.

Figure 5:
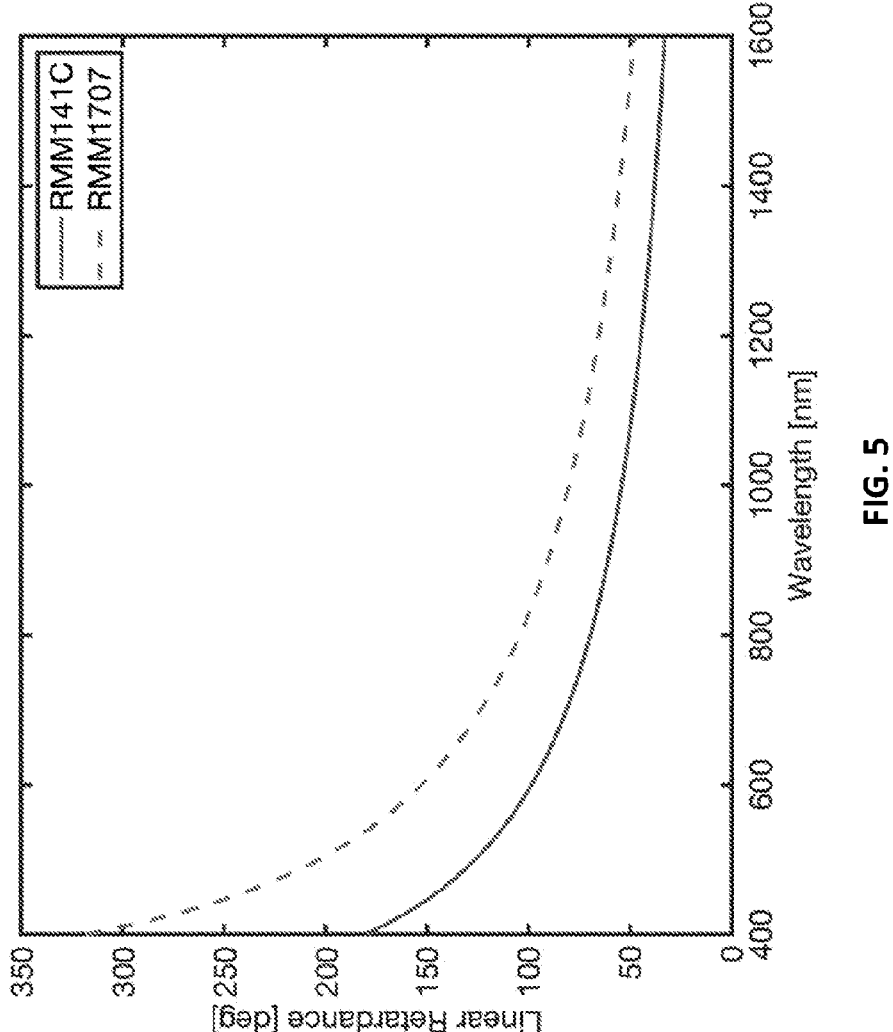
FIG. 5 illustrates plots of linear retardance for RMM141C and RMM1707 as a function of wavelength in the range 400-1600 nm.

One important parameter of the compensator is the thickness of each birefringent thin film layer, which can be defined relative to the retardance of a sample thin film for each material, as provided in the Table in FIG. 4. While the thickness values can be readily converted to the units of length (e.g., μm), it may be beneficial to provide the relative thickness values with reference to a standard or a known sample that can be reliably measured. For example, samples of RMM141C and RMM1707 can be made for the purpose of measuring the retardance of the material as a function of wavelength, which can be subsequently used as the references for specifying the designed layer thicknesses. The thickness of a birefringent thin film is linearly related to its retardance. FIG. 5 illustrates the change in linear retardance of RMM141C and RMM1707 in the wavelength range 400-1600 nm. For example, the standard thickness of a thin film RMM141C is defined to be 1.12, a dimensionless number. A sample of this thickness has a linear retardance that varies from 180 degrees to 70 degrees in the wavelength interval of 400 nm to 800 nm, as shown in FIG. 5. A sample of RMM141C with a thickness of 2.24 has twice the retardance as compared to the sample with 1.12 thickness. Similarly, a thickness for a thin film sample of RMM1707 is defined to be 1.13, when the linear retardance of the film varies from 400 degrees to 100 degrees in the wavelength interval of 400 nm to 800 nm. The thickness values calculated based on the disclosed techniques ensure each individual layer has the proper retardance properties.

Figure 6:
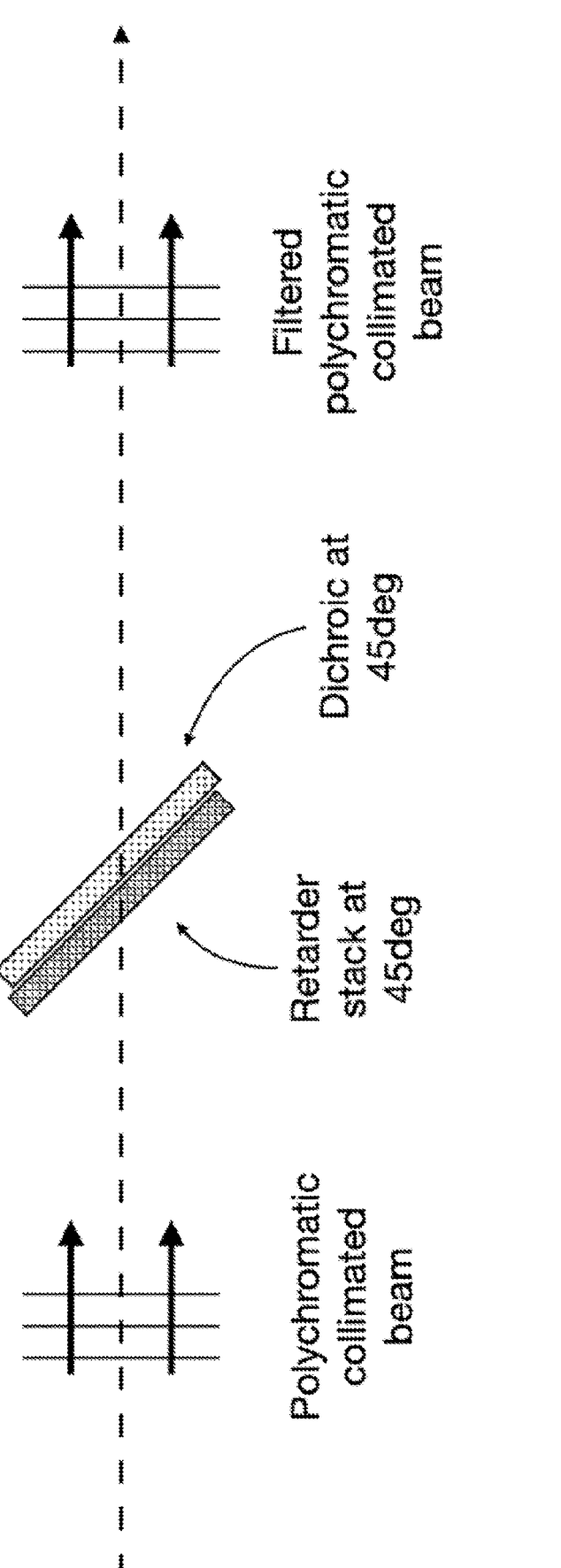
FIG. 6 illustrates an optical system that includes a compensator and a dichroic filter both operating at a 45-degree angle of incidence in accordance with an example embodiment.

A second example compensator can be designed for 45-degree angle of incidence. FIG. 6 illustrates an example configuration where a compensator is positioned to receive a polarized polychromatic collimated light at 45-degree angle of incidence. By using this design, the residual parasitic retardance can be reduced. The compensator (e.g., retarder stack) is positioned to the left of the interference filter (e.g., dichroic filter) but, in alternate implementations, the retarder stack can be positioned at either or both sides of the interference filter.

Figure 7:
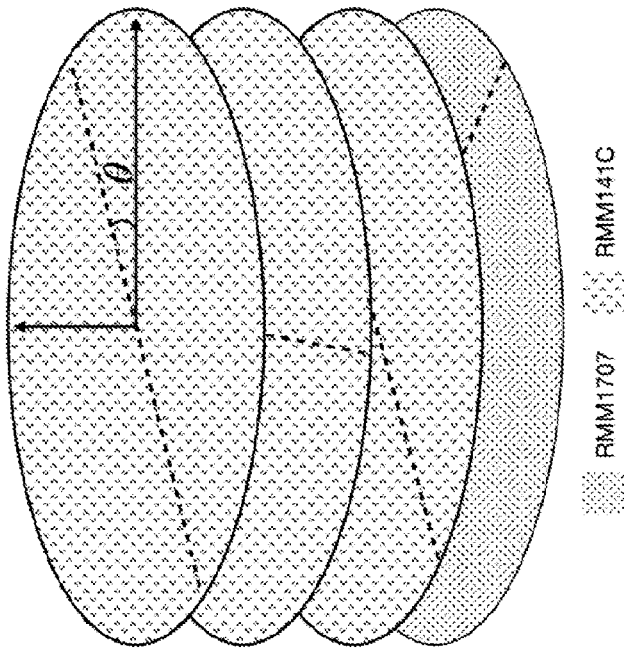
FIG. 7 illustrates parameters and a schematic of a multi-layer compensator corresponding to the configuration of FIG. 6 in accordance with an example embodiment.

FIG. 7 includes a Table illustrating the parameters that were solved for the 45-degree angle of incidence design of FIG. 6, as well as a schematic showing the differing materials and fast-axis angles of the compensator film stack. The design utilizes four layers of LCP, with differing fast-axis orientations and thicknesses, which are similar to the first example compensator but have different thicknesses and fast-axis values that are obtained for the 45-degree angle of incidence. Having the same orientation as the interference filter allows for direct coating of the liquid crystal polymer layers onto the short-pass filter, resulting in a single substrate optic.

Figure 8:
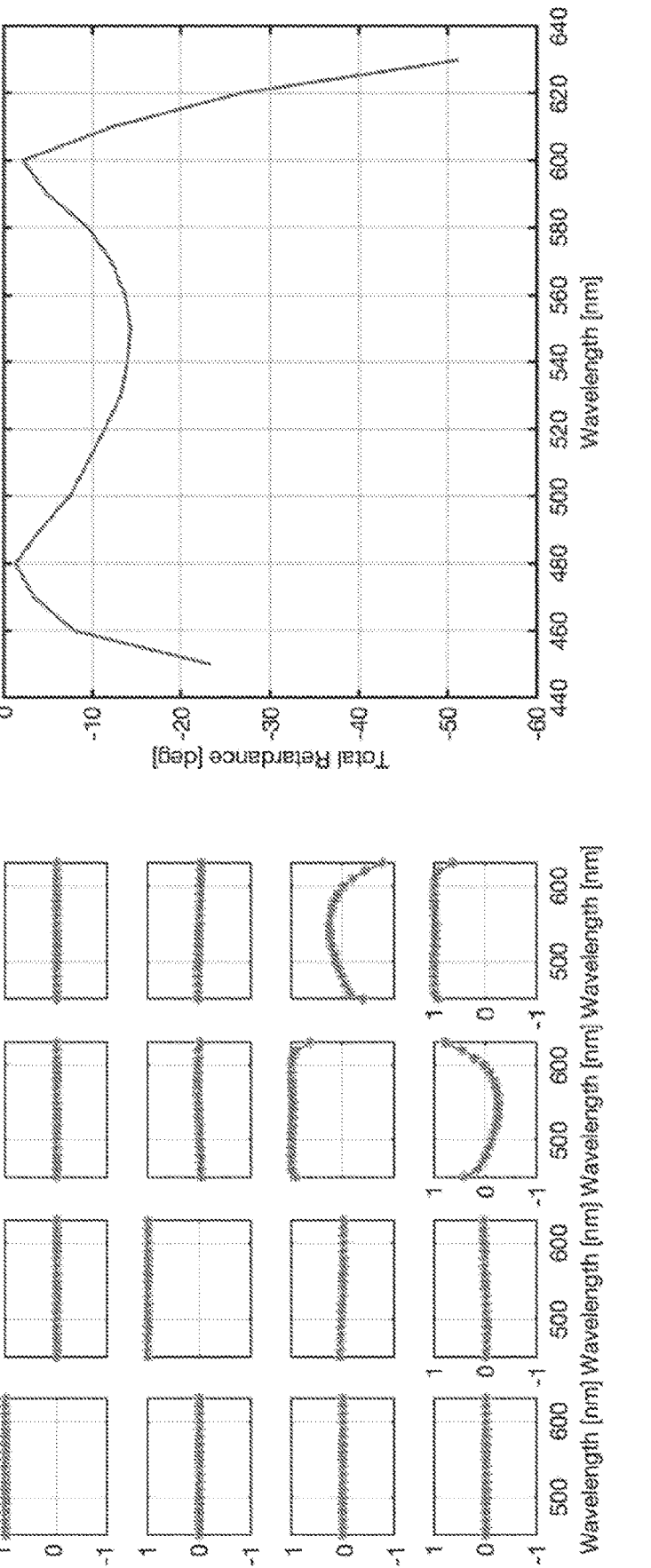
FIG. 8 illustrates the Mueller matrix and residual retardance associated with the combination of the compensator and filter of FIG. 6.

FIG. 8 (left) illustrates a simulated Mueller matrix values of the combination short-pass filter and compensator for the configuration in FIGS. 6 and 7, and the residual retardance (left side of FIG. 8) from the combination short-pass filter and compensator. The example optical system in FIG. 8 shows significant correction from 450 nm to 610 nm.

In designing the disclosed compensators that comprise a plurality of layers of birefringent material, various parameters and factors are taken into account. Some of these factors relate to the design requirements or specifications for a particular application or device, while others relate to design parameters that can be adjusted or varied (or solved for) to produce the desired compensator configuration. These factors include the angle of incidence on the compensator, the polarization state of the incident light, the number of layers in the compensator, the thickness of each layer, the materials of each layer, the fast-axis angle of each layer, the desired spectral range for operation, the acceptable range (or tolerance) of residual retardance, and the sensitivity of the design to variations in parameters such as layer thickness, fast-axis angles, and others.

Figure 9:
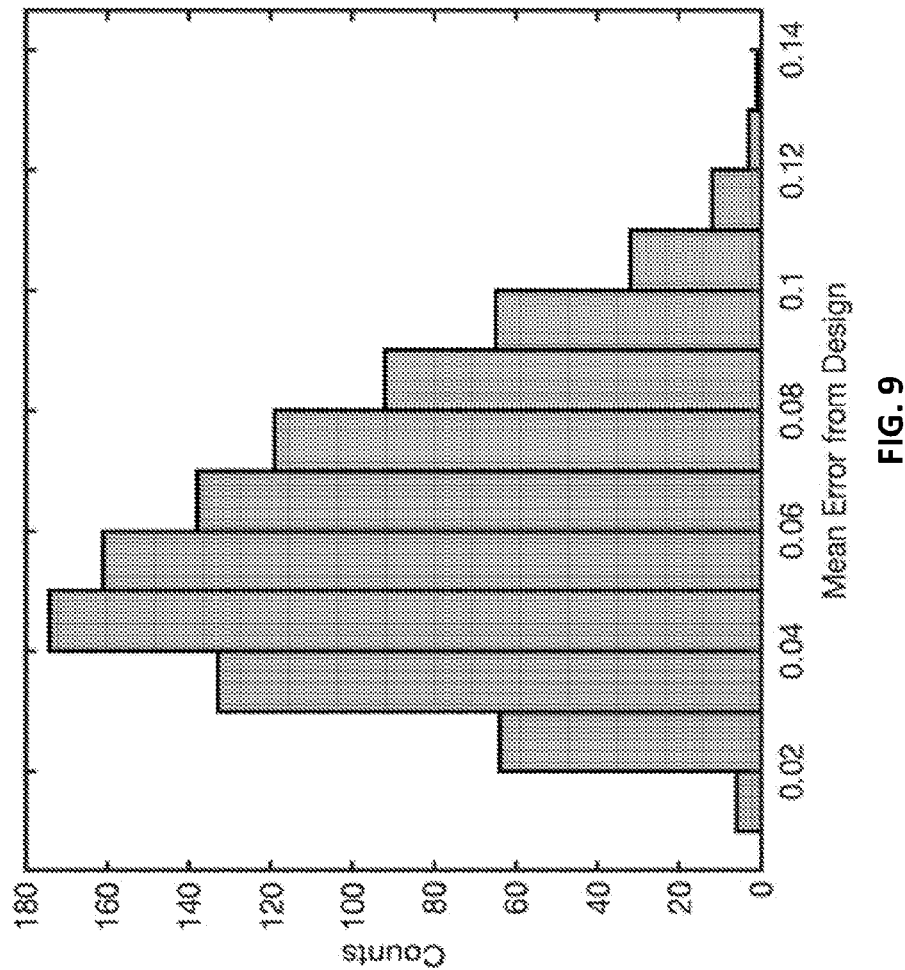
FIG. 9 illustrates mean error value associated with a Monte Carlo simulation example in which the optimal design was varied 1000 times by varying the fast-axis angle and the thickness of each layer in the compensator.

To assess the stability of the final design, a Monte Carlo simulation was run to analyze possible deviations from the optimized design during fabrication. Deviations can include the alignment of the fast-axis for each of the individual layers, as well as the fabricated thicknesses of individual layers which are not exactly as the design prescribes. The Monte Carlo simulation perturbed the optimal design 1000 times, and varied the fast-axis angle of each of the layers by up to #1° and the thickness of each layer by up to 5% from the optimized design. The variation in the perturbed designs was quantified using Eq. (1) and compared to the optimally designed Mueller matrix. Comparisons of each of the perturbed designs is presented in FIG. 9, which illustrates that even with the above-noted fabrication errors, the device performs within 7-8% of the original design requirements.

The disclosed compensators allow for the elimination of polarization aberrations found in inference filters and can be used to fix the parasitic retardance in numerous different interference filter designs. In some embodiments, to design the disclosed compensators, the measured Mueller matrix of the interference filter and the retardance dispersion of the material(s) used in the compensator at the operating wavelength band are obtained and used as described herein to construct the compensator that minimizes or eliminates the unwanted polarization aberrations. To increase the bandwidth of the device (i.e., to extend or add to the spectral range of corrections), additional layers of birefringent material can be added. This is analogous to adding multiple materials to increase the color correction in refraction-based systems.

Figure 10:
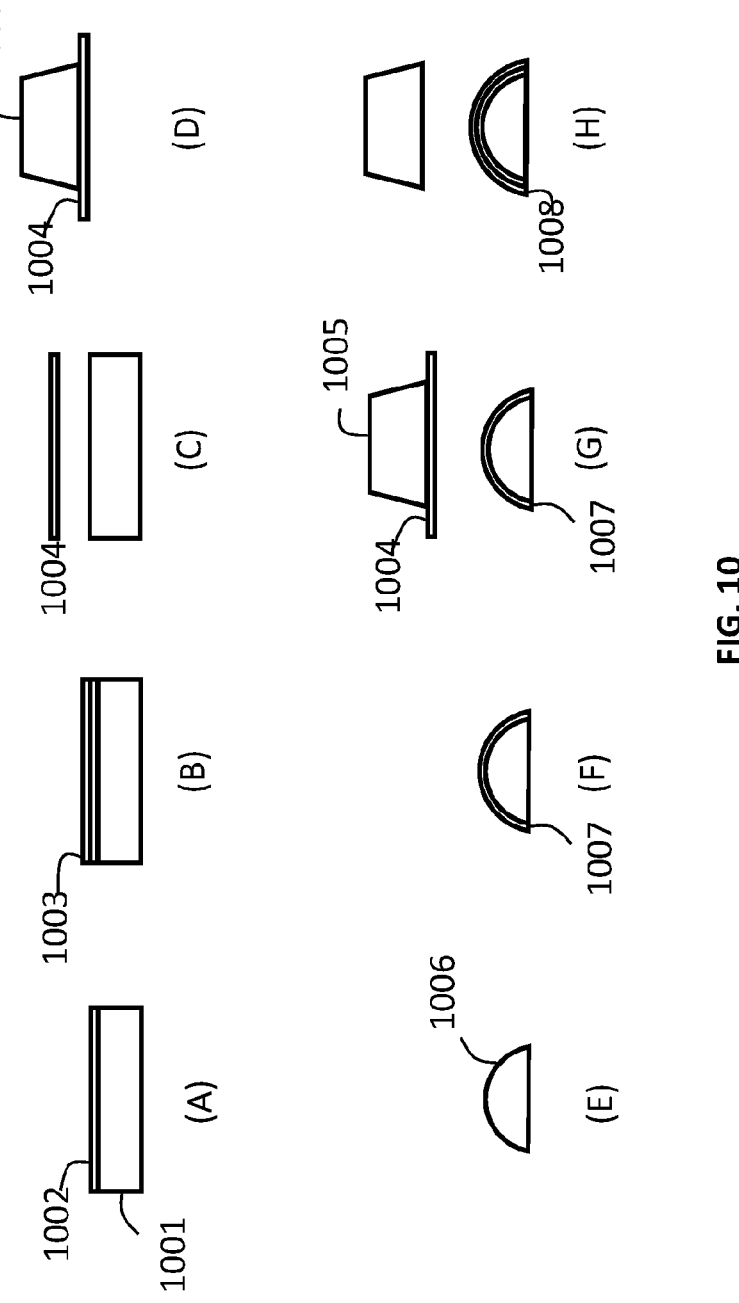
FIG. 10 illustrates a process to fabricate and position a flexible thin film coating onto a curved surface in accordance with an example embodiment.
Figure 11:
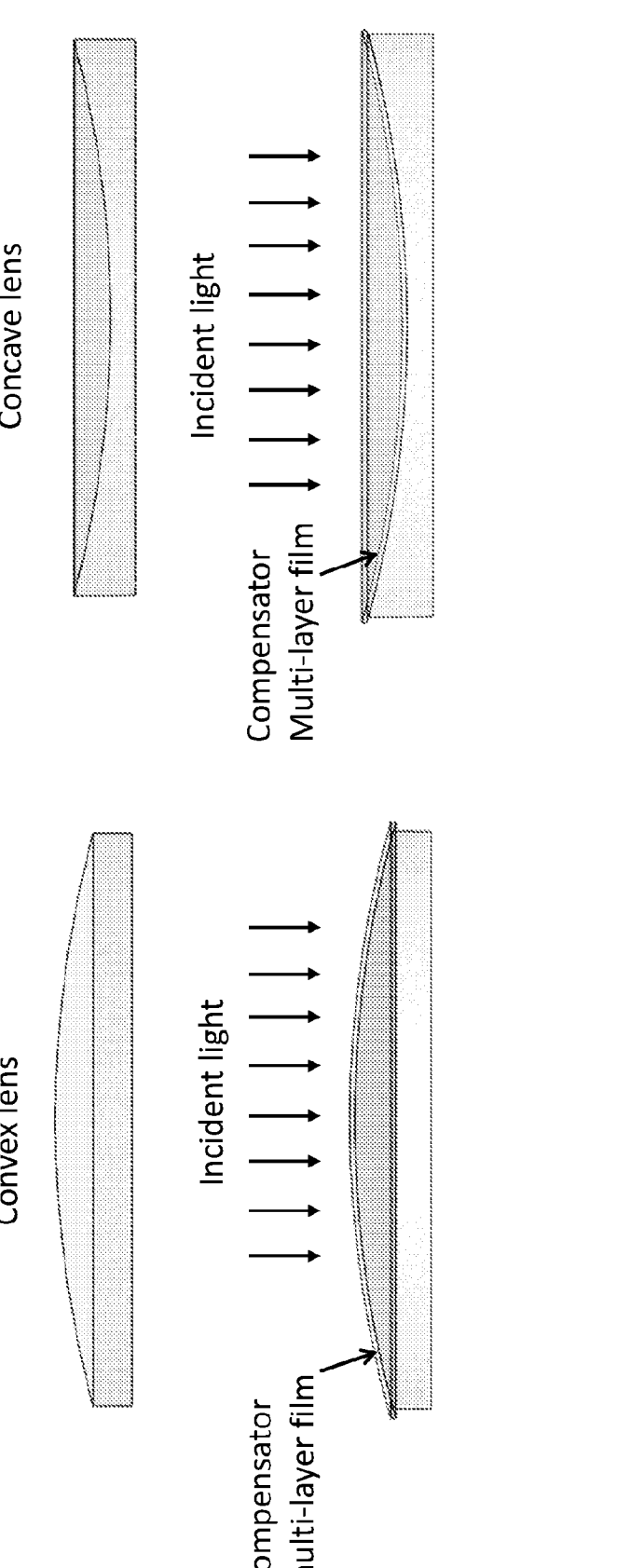
FIG. 11 illustrates application of example multi-layer compensators to a convex and a concave lens.

Birefringent materials for the filter can be nematic LCP such as A-plate, C-plate materials, cholesteric LCP or a combination thereof. Other birefringent materials can be crystalline materials such as calcite and quartz. LCP can be deposited by spin coating. One advantage of LCP is its flexibility, which can be applied to non-flat surface. FIG. 10 illustrates a process to fabricate and position a flexible thin film coating onto a curved surface. At the end of the process, the thin film comprising multi-layer birefringent materials is coated conformally on the non-flat surface. In (A), a substrate 1001 is coated with a layer of photoalignment material 1002 SD1, a type of sulfonic azo-dye which is available from DIC Corporation (formerly Dainippon Ink and Chemicals) Japan. The photoalignment material 1002 is exposed with linearly polarized ultraviolet light to set the fast-axis angle (not shown). In (B), an LCP layer 1003 is subsequently coated on top of the photoalignment material. The process can be repeated for multiple layers with different fast-axis angles using different types of LCP and/or photoalignment materials. A thin barrier layer, such as Norland adhesive NOA 73 (Norland Products Inc. Cranbury NJ) or silicon dioxide, may be deposited in between to separate the multiple layers of LCPs. After the filter 1004 is completed, in (C), the entire substrate can be submerged in water. The SD1 photoalignment layer 1002 also acts as a sacrificial layer, which dissolves in water. The optical filter 1004 is delaminated and is separated from the substrate 1001. As illustrated in (D), the film filter 1004 can be picked up by a vacuum chuck 1005. A curved, non-flat, surface 1006 (shown in (E)) is coated (in (F)), with an adhesion layer 1007 by vapor deposition. In (G), using the vacuum chuck 1005, the optical filter 1004 is put on top of the adhesion layer 1007 that was deposited on surface 1006 to form a conformal coating 1008. The flexibility of the film 1004 allows its attachment to a curved surface 1006 without much distortion. In some embodiments of the fabrication process, alignment marks can be fabricated on the film and on the curved substrate to accurately align the film to the substrate. FIG. 11 illustrates example applications of the disclosed compensators as a multi-layer film to a convex (left) and a concave (right) surface. The film can cover the entire optical surface.

Figure 12:
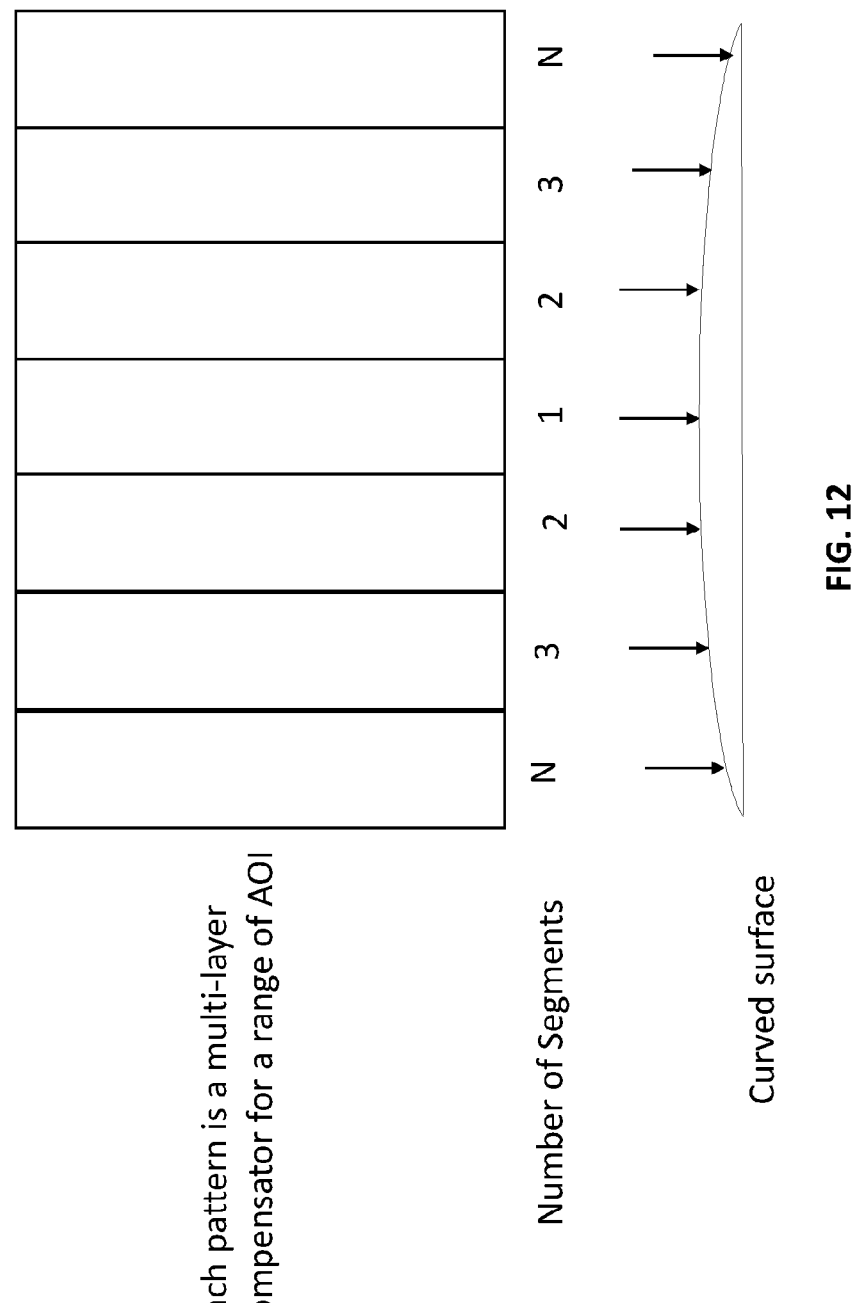
FIG. 12 illustrates an example multi-layer compensator in accordance with an example embodiment that conforms to a concave surface.

The disclosed polarization aberration compensators can be designed to accommodate variations in the light angle that is incident thereon. For example, angles of incidence between 0) to 15 degrees can be accommodated. This aspect of the disclosed embodiments is especially advantageous for polarization aberration compensators that are designed to conform to a curved surface, for example spherical, cylindrical, polynomial or free form surfaces. FIG. 12 illustrates an example multi-layer compensator in accordance with an example embodiment that conforms to a concave surface. The surface area of interest is divided into multiple segments, where each segment is associated with a particular angle of incidence, or a particular range of angles of incidence. The multi-layer polarization aberration compensator design is then performed for each segment to minimize or reduce the polarization aberrations for each segment. In the example configuration of FIG. 12, the target surface (e.g., the convex surface of a cylindrical lens which may include an interference filter) is divided into seven segments that form symmetrical patterns of four unique multi-layer films (one in the center and three at each side). The multi-layer, multi-segmented compensator can then be applied to the convex surface, as for example described in connection with FIG. 10.

FIG. 13 illustrates a set of operation that can be carried out for producing a polarization aberration compensator for a thin film interference filter in accordance with an example embodiment. At 1302, a set of Mueller matrix values based on polarization measurements of the thin film interference filter over a spectral range are obtained. The Mueller matrix values exhibit polarization aberrations associated with the thin film interference filter over the spectral range. At 1304, a metric is generated based on a difference between a compensated Mueller matrix and an identity matrix over the spectral range. The compensated matrix represents a cumulative Mueller matrix for a combination of the thin film interference filter and the polarization aberration compensator. At 1306, a configuration of the polarization aberration compensator is determined based on evaluating the metric that eliminates or reduces the difference between the compensated Mueller matrix and the identity matrix over the spectral range. The polarization aberration compensator includes a plurality of birefringent layers, and determining the configuration of the polarization aberration compensator includes determining one or more of a thickness of each birefringent layer, a fast-axis angle of each birefringent layer, and a number of the plurality of birefringent layers.

In one example embodiment, determining the configuration of the polarization aberration compensator includes determining a birefringent material for each birefringent layer. In another example embodiment, one or both of the fast-axis angle and the thickness of each birefringent layer is different from fast-axis angles and thicknesses of other birefringent layers in the plurality of birefringent layers. In still another example embodiment, the fast-axis angle, the thickness and the birefringent material of each birefringent layer are different from fast-axis angles, thicknesses and birefringent materials of other birefringent layers in the plurality of birefringent layers. In yet another example embodiment, determining the configuration of the polarization aberration compensator is based on an angle of incidence of light on the polarization aberration compensator.

According to another example embodiment, determining the configuration of the polarization aberration compensator is based on an orientation angle of the polarization aberration compensator with respect to the thin film interference filter. In one example embodiment, the polarization aberration compensator is configured to receive light that is incident thereon at a normal angle, and the thin film interference filter is configured to receive light at an angle of incidence that is other than zero or 90 degrees. In another example embodiment, the polarization aberration compensator and the thin film interference filter are positioned at the same angle, which is other than zero or 90 degrees, with respect to collimated light that is incident on them. In yet another example embodiment, the metric is generated based on a square of the difference between the compensated Mueller matrix and the identity matrix over the spectral range.

In one example embodiment, evaluating the metric includes optimizing the metric that comprises solving a constrained nonlinear multivariable equation to obtain a global minimum. In another example embodiment, determining the thickness of each birefringent layer having a particular birefringent material includes: measuring retardance dispersion over the spectral range of a sample layer having the particular birefringent material and using the measured retardance dispersion as a reference to determine the thickness of the birefringent layer having the particular birefringent material needed for the birefringent layer to be implemented as part of the polarization aberration compensator. In still another example embodiment, evaluating the metric includes optimizing the metric to obtain a retardance associated with the combination of the thin film interference filter and the polarization aberration compensator that is within a particular range over the spectral range. In yet another example embodiment, the particular range has a magnitude that is between zero and 10% over the spectral range.

In another example embodiment, determining the configuration of the polarization aberration compensator includes: dividing the polarization aberration compensator into multiple segments, wherein each segment is associated with a particular angle of incidence, or a particular range of angles of incidence, and determining the configuration of the polarization aberration compensator for each segment based on the particular angle of incidence, or the particular range of angles of incidence, associated with that segment. In yet another example embodiment, the method for producing a polarization aberration compensator includes imparting a predetermined change in one or more of the thickness or fast-axis angle of one or more of the birefringent layers; and determining whether or not a performance of the combination of the thin film interference filter and the polarization aberration compensator, after imparting the predetermined change, is maintained with a predetermined tolerance.

Another aspect of the disclosed embodiments relates to a device comprising a processor and a memory including instructions stored thereon, wherein the instructions upon execution by the processor configure the processor to determine a configuration for a polarization aberration compensator for a thin film interference filter by at least the following operations: obtaining a set of Mueller matrix values based on polarization measurements of the thin film interference filter over a spectral range, wherein the Mueller matrix values exhibit polarization aberrations associated with the thin film interference filter over the spectral range, generating a metric based on a difference between a compensated Mueller matrix and an identity matrix over the spectral range, wherein the compensated matrix represents a cumulative Mueller matrix for a combination of the thin film interference filter and the polarization aberration compensator; and determining a configuration of the polarization aberration compensator based on evaluating the metric that eliminates or reduces the difference between the compensated Mueller matrix and the identity matrix over the spectral range. In these set of operations, the polarization aberration compensator includes a plurality of birefringent layers, and determining the configuration of the polarization aberration compensator includes determining one or more of a thickness of each birefringent layer, a fast-axis angle of each birefringent layer, and a number of the plurality of birefringent layers.

Another aspect of the disclosed embodiments relates to a polarization aberration compensator for compensating polarization aberrations associated with an interference filter. The polarization aberration compensator includes a first optical layer comprising a first thickness, a first birefringent material and a first fast-axis angle, and one or more additional optical layers, each additional optical layer having an associated thickness and an associated fast-axis angle. The first optical layer and the one or more additional optical layers form a multi-layer film that, when considered in combination with the interference filter, is configured to reduce or eliminate polarization aberrations associated with the interference filter. Furthermore, at least a number of layers in the multi-layer film, a thickness of each layer in the multi-layer film and a fast-axis orientation of each layer in the multi-layer film are selected to eliminate or reduce a difference between a compensated Mueller matrix and an identity matrix over the spectral range. The compensated Mueller matrix corresponds to a combination of the multi-layer film and the interference filter, and at least one of the one or more additional optical layers includes a second birefringent material that is different from the first birefringent material.

In one example embodiment, one or both of the fast-axis angle and the thickness of each birefringent layer is different from fast-axis angles and thicknesses of other birefringent layers in the multi-layer film. In another example embodiment, the multi-layer film is positioned on a substrate to allow placement of the polarization aberration compensator in an optical system as a separate component from the interference filter. In still another example embodiment, the multi-layer film is positioned on the interference filter. In yet another example embodiment, the multi-layer film is configured to conform to a curved surface.

According to another example embodiment, the multi-layer film is a first segment of a multi-segmented polarization aberration compensator, and each segment of the multi-segmented polarization aberration compensator is configured to reduce or eliminate polarization aberrations associated with a corresponding segment of the interference filter for a particular angle, or a particular range of angles, of incidence of light thereon. In one example embodiment, the multi-layer film includes at least four birefringent layers. In another example embodiment, the first or the second birefringent material includes one of: a nematic liquid crystal polymer (LCP), a cholesteric LCP or a combination thereof. In yet another example embodiment, the polarization aberration compensator is part of an optical system that includes the interference filter, and the interference filter is positioned at an angle with respect to light that is incident thereon. In another example embodiment, the polarization aberration compensator is positioned to received light that is incident thereon at a normal angle. In still another example embodiment, the polarization aberration compensator is positioned at the same angle as the interference filter with respect to light that is incident thereon.

At least part of the operations described in connection with the disclosed embodiments can be carried out using a system that includes a processer/controller. The processor/controller is coupled to a memory that stores processor executable code that causes the processor/controller to perform computations and/or to generate and transmit/receive suitable information to/from the various system components, as well as suitable input/output (IO) capabilities (e.g., wired or wireless) to transmit and receive commands and/or data to and from other devices, or a through a user interface.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method for producing a polarization aberration compensator for a thin film interference filter, the method comprising:

obtaining a set of Mueller matrix values based on polarization measurements of the thin film interference filter over a spectral range, wherein the set of Mueller matrix values exhibit polarization aberrations associated with the thin film interference filter over the spectral range;

generating a metric based on a difference between a compensated Mueller matrix and an identity matrix over the spectral range, wherein the compensated Mueller matrix represents a cumulative Mueller matrix for a combination of the thin film interference filter and the polarization aberration compensator; and determining a configuration of the polarization aberration compensator based on evaluating the metric that eliminates or reduces the difference between the compensated Mueller matrix and the identity matrix over the spectral range, wherein the polarization aberration compensator includes a plurality of birefringent layers, and determining the configuration of the polarization aberration compensator includes determining one or more of a thickness of each birefringent layer, a fast-axis angle of each birefringent layer, and a number of the plurality of birefringent layers.

2. The method of claim 1, wherein determining the configuration of the polarization aberration compensator includes determining a birefringent material for each birefringent layer.

3. The method of claim 2, wherein one or both of the fast-axis angle and the thickness of each birefringent layer is different from fast-axis angles and thicknesses of other birefringent layers in the plurality of birefringent layers.

4. The method of claim 2, wherein the fast-axis angle, the thickness and the birefringent material of each birefringent layer are different from fast-axis angles, thicknesses and birefringent materials of other birefringent layers in the plurality of birefringent layers.

5. The method of claim 1, wherein determining the configuration of the polarization aberration compensator is based on an angle of incidence of light on the polarization aberration compensator.

6. The method of claim 1, wherein determining the configuration of the polarization aberration compensator is based on an orientation angle of the polarization aberration compensator with respect to the thin film interference filter.

7. The method of claim 6, wherein the polarization aberration compensator is configured to receive light that is incident thereon at a normal angle, and the thin film interference filter is configured to receive light at an angle of incidence that is other than zero or 90 degrees.

8. The method of claim 6, wherein the polarization aberration compensator and the thin film interference filter are positioned at the same angle, which is other than zero or 90 degrees, with respect to collimated light that is incident on them.

9. The method of claim 1, wherein the metric is generated based on a square of the difference between the compensated Mueller matrix and the identity matrix over the spectral range.

10. The method of claim 1, wherein evaluating the metric includes optimizing the metric that comprises solving a constrained nonlinear multivariable equation to obtain a global minimum.

11. The method of claim 1, wherein determining the thickness of each birefringent layer having a particular birefringent material includes: measuring retardance dispersion over a spectral range of a sample layer having the particular birefringent material and using the measured retardance dispersion as a reference to determine the thickness of the birefringent layer having the particular birefringent material needed for the birefringent layer to be implemented as part of the polarization aberration compensator.

12. The method of claim 1, wherein evaluating the metric includes optimizing the metric to obtain a retardance associated with the combination of the thin film interference filter and the polarization aberration compensator that is within a particular range over the spectral range.

13. The method of claim 12, wherein the particular range has a magnitude that is between zero and 10% over the spectral range.

14. The method of claim 1, wherein determining the configuration of the polarization aberration compensator includes:

dividing the polarization aberration compensator into multiple segments, wherein each segment is associated with a particular angle of incidence, or a particular range of angles of incidence, and determining the configuration of the polarization aberration compensator for each segment based on the particular angle of incidence, or the particular range of angles of incidence, associated with that segment.

15. The method of claim 1, further comprising:

imparting a predetermined change in one or more of the thickness or fast-axis angle of one or more of the birefringent layers; and determining whether or not a performance of the combination of the thin film interference filter and the polarization aberration compensator, after imparting the predetermined change, is maintained with a predetermined tolerance.

16. A device comprising a processor and a memory including instructions stored thereon, wherein the instructions upon execution by the processor configure the processor to determine a configuration for a polarization aberration compensator for a thin film interference filter by at least:

obtaining a set of Mueller matrix values based on polarization measurements of the thin film interference filter over a spectral range, wherein the set of Mueller matrix values exhibit polarization aberrations associated with the thin film interference filter over the spectral range;

generating a metric based on a difference between a compensated Mueller matrix and an identity matrix over the spectral range, wherein the compensated Mueller matrix represents a cumulative Mueller matrix for a combination of the thin film interference filter and the polarization aberration compensator; and determining a configuration of the polarization aberration compensator based on evaluating the metric that eliminates or reduces the difference between the compensated Mueller matrix and the identity matrix over the spectral range, wherein:

the polarization aberration compensator includes a plurality of birefringent layers, and determining the configuration of the polarization aberration compensator includes determining one or more of a thickness of each birefringent layer, a fast-axis angle of each birefringent layer, and a number of the plurality of birefringent layers.

17. A polarization aberration compensator for compensating polarization aberrations associated with an interference filter, the polarization aberration compensator comprising:

a first optical layer comprising a first thickness, a first birefringent material and a first fast-axis angle; and one or more additional optical layers, each additional optical layer having an associated thickness and an associated fast-axis angle, wherein:

the first optical layer and the one or more additional optical layers form a multi-layer film that, when considered in combination with the interference filter, is configured to reduce or eliminate polarization aberrations associated with the interference filter, and at least a number of layers in the multi-layer film, a thickness of each layer in the multi-layer film and a fast-axis orientation of each layer in the multi-layer film are selected to eliminate or reduce a difference between a compensated Mueller matrix and an identity matrix over a spectral range, the compensated Mueller matrix corresponding to a combination of the multi-layer film and the interference filter, and at least one of the one or more additional optical layers includes a second birefringent material that is different from the first birefringent material.

18. The polarization aberration compensator of claim 17, wherein one or both of the fast-axis angle and the thickness of each birefringent layer is different from fast-axis angles and thicknesses of other birefringent layers in the multi-layer film.

19. The polarization aberration compensator of claim 17, wherein the multi-layer film is positioned on a substrate to allow placement of the polarization aberration compensator in an optical system as a separate component from the interference filter.

20. The polarization aberration compensator of claim 17, wherein the multi-layer film is positioned on the interference filter.

21. The polarization aberration compensator of claim 17, wherein the multi-layer film is configured to conform to a curved surface.

22. The polarization aberration compensator of claim 21, wherein:

the multi-layer film is a first segment of a multi-segmented polarization aberration compensator, and each segment of the multi-segmented polarization aberration compensator is configured to reduce or eliminate polarization aberrations associated with a corresponding segment of the interference filter for a particular angle, or a particular range of angles, of incidence of light thereon.

23. The polarization aberration compensator of claim 17, wherein the multi-layer film includes at least four birefringent layers.

24. The polarization aberration compensator of claim 17, wherein the first or the second birefringent material includes one of: a nematic liquid crystal polymer (LCP), a cholesteric LCP or a combination thereof.

25. The polarization aberration compensator of claim 17, wherein the polarization aberration compensator is part of an optical system that includes the interference filter, and wherein the interference filter is positioned at an angle with respect to light that is incident thereon.

26. The polarization aberration compensator of claim 25, wherein the polarization aberration compensator is positioned to receive light that is incident thereon at a normal angle.

27. The polarization aberration compensator of claim 25, wherein the polarization aberration compensator is positioned at the same angle as the interference filter with respect to light that is incident thereon.

* * * * *